United States Patent
Dasgupta

(10) Patent No.: US 11,132,605 B2
(45) Date of Patent: Sep. 28, 2021

(54) CARDINAL SINE AS AN ACTIVATION FUNCTION FOR UNIVERSAL CLASSIFIER TRAINING DATA

(71) Applicant: International Business Machines Corporation, Armonk, NY (US)

(72) Inventor: Abhishek Dasgupta, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 983 days.

(21) Appl. No.: 15/817,365

(22) Filed: Nov. 20, 2017

(65) Prior Publication Data

US 2019/0156192 A1    May 23, 2019

(51) Int. Cl.
| | |
|---|---|
| G06N 3/08 | (2006.01) |
| G06K 9/62 | (2006.01) |
| G06F 17/17 | (2006.01) |
| G06N 3/04 | (2006.01) |

(52) U.S. Cl.
CPC ............ *G06N 3/08* (2013.01); *G06F 17/17* (2013.01); *G06K 9/6219* (2013.01); *G06K 9/6256* (2013.01); *G06K 9/6281* (2013.01); *G06N 3/0481* (2013.01)

(58) Field of Classification Search
CPC ........ G06N 3/08; G06N 3/0481; G06F 17/17; G06K 9/6219; G06K 9/6256; G06K 9/6281
See application file for complete search history.

(56) References Cited

U.S. PATENT DOCUMENTS

| | | | |
|---|---|---|---|
| 2003/0059106 A1* | 3/2003 | Gutta | G08B 21/0423 382/158 |
| 2016/0260014 A1 | 9/2016 | Hagawa | |
| 2016/0364419 A1 | 12/2016 | Stanton | |

FOREIGN PATENT DOCUMENTS

JP        2017049907 A       3/2017

OTHER PUBLICATIONS

Demir, S., Karadeniz, A., Manav Demir, N. Using Steepness Coefficient to Improve Artificial Neural Network Performance for Environmental Modeling. Polish Journal of Environmental Studies, 25(4), 1467-1477. https://doi.org/10.15244/pjoes/61958 (Year: 2016).*
Miravet, Carlos, and Francisco B. Rodn. "A two-step neural-network based algorithm for fast image super-resolution." Image and Vision Computing 25.9 (2007): 1449-1473. (Year: 2007).*

(Continued)

*Primary Examiner* — Alexey Shmatov
*Assistant Examiner* — Ahsif A. Sheikh
(74) *Attorney, Agent, or Firm* — David B. Woycechowsky

(57) ABSTRACT

Cardinal sine function used as an activation function for a hierarchical classifier. Application of a sine function, or a cardinal sine function, for hierarchical classification of a subject within subject matter domains and sub-domains. Hierarchical classification or multi-level classification is improved through use of the cardinal sine function or even standard sine function. Some embodiments of the present invention focus on the usage of cardinal sine function as activation function and how to apply this cardinal sine function for hierarchical classification of a subject. Some embodiments include a technique by which hierarchical classification or multi-level classification can benefit from application of a cardinal sine function.

15 Claims, 4 Drawing Sheets

(56) References Cited

OTHER PUBLICATIONS

"Activation function", Wikipedia, This page was last edited on Oct. 29, 2017, at 00:55, 5 pages, <https://en.wikipedia.org/wiki/Activation_function>.

"Artificial neural network", Wikipedia, This page was last edited on Oct. 29, 2017, at 22:39, 44 pages, <https://en.wikipedia.org/wiki/Artificial_neural_network>.

"Hierarchical classifier", Wikipedia, This page was last edited on Jun. 13, 2017, at 01:18, 2 pages, <https://en.wikipedia.org/wiki/Hierarchical_classifier>.

Demir et al., "Using Steepness Coefficient to Improve Artificial Neural Network Performance for Environmental Modeling", Pol. J. Environ. Stud. vol. 25, No. 4 (2016), 1467-1477, DOI: 10.15244/pjoes/61958, Accepted: Feb. 25, 2016.

Rivals et al., "Neural network construction and selection in non-linear modeling", IEEE Transactions on Neural Networks, Institute of Electrical and Electronics Engineers, 2003, 14 (4), pp. 804-819. <hal-00797670>.

Efe, Mehmet Onder, "Novel Neuronal Activation Functions for Feedforward Neural Networks", Neural Process Lett (2008) 28:63-79, DOI 10.1007/s11063-008-9082-0, Published online: Aug. 21, 2008, 17 Pages.

Georg-Johann, "File:Si sinc.svg", From Wikimedia Commons, the free media repository, Oct. 16, 2011, 5 pages.

Gomes et al., "Comparison of new activation functions in neural network for forecasting financial time series", Neural Comput & Applic (2011) 20:417-439, DOI 10.1007/s00521-010-0407-3, / Accepted: Jun. 4, 2010 / Published online: Jun. 20, 2010, 23 pages.

Kocak, Taskin, "Sigmoid Functions and Their Usage in Artificial Neural Networks", School of Electrical Engineering and Computer Science, Applications of Calculus II: Inverse Functions, 29 pages, provided in Invention Disclosure dated Oct. 2015.

Parascandolo et al., Taming the Waves: Sine as Activation Function in Deep Neural Networks, Under review as a conference paper at ICLR 2017, 12 pages.

* cited by examiner

CARDINAL SINE AS AN ACTIVATION FUNCTION FOR UNIVERSAL CLASSIFIER TRAINING DATA

BACKGROUND

The present invention relates generally to the field of artificial neural networks, and more particularly to activation functions for use in artificial neural networks.

The Wikipedia entry for "artificial neural networks" (ANN) states as follows: "Artificial neural networks (ANNs), a form of connectionism, are computing systems inspired by the biological neural networks that constitute animal brains . . . . Such systems learn (progressively improve performance) to do tasks by considering examples, generally without task-specific programming . . . . An ANN is based on a collection of connected units called artificial neurons . . . . Each connection (synapse) between neurons can transmit a signal to another neuron. The receiving (postsynaptic) neuron can process the signal(s) and then signal downstream neurons connected to it. Neurons may have state, generally represented by real numbers . . . . Neurons and synapses may also have a weight that varies as learning proceeds, which can increase or decrease the strength of the signal that it sends downstream. Further, they may have a threshold such that only if the aggregate signal is below (or above) that level is the downstream signal sent . . . . An (artificial) neural network is a network of simple elements called neurons, which receive input, change their internal state (i.e. the activation) according to that input and an activation function, and produce output depending on the input and the activation."

The Wikipedia entry for "activation function" states that the cardinal sine function can be used as an activation function in an ANN.

The Wikipedia entry for "hierarchical classifier" states as follows: "A hierarchical classifier is a classifier that maps input data into defined subsumptive output categories. The classification occurs first on a low-level with highly specific pieces of input data. The classifications of the individual pieces of data are then combined systematically and classified on a higher level iteratively until one output is produced. This final output is the overall classification of the data. Depending on application-specific details, this output can be one of a set of pre-defined outputs, one of a set of on-line learned outputs, or even a new novel classification that hasn't been seen before. Generally, such systems rely on relatively simple individual units of the hierarchy that have only one universal function to do the classification. In a sense, these machines rely on the power of the hierarchical structure itself instead of the computational abilities of the individual components."

More generally, a "classifier" is any set of computer software, hardware and/or firmware for mapping input data into categories, regardless of whether the categories are hierarchically organized or not.

SUMMARY

According to an aspect of the present invention, there is a method, computer program product and/or system that performs the following operations (not necessarily in the following order): (i) receiving an untrained hierarchical classifier than includes an artificial neural network that includes a directed graph model including a plurality of nodes and a plurality of directed connections among and between the nodes; and (ii) training the untrained hierarchical classifier algorithm to obtain a trained hierarchical classifier using a sinc function as an activation function.

DETAILED DESCRIPTION

Figure 1:
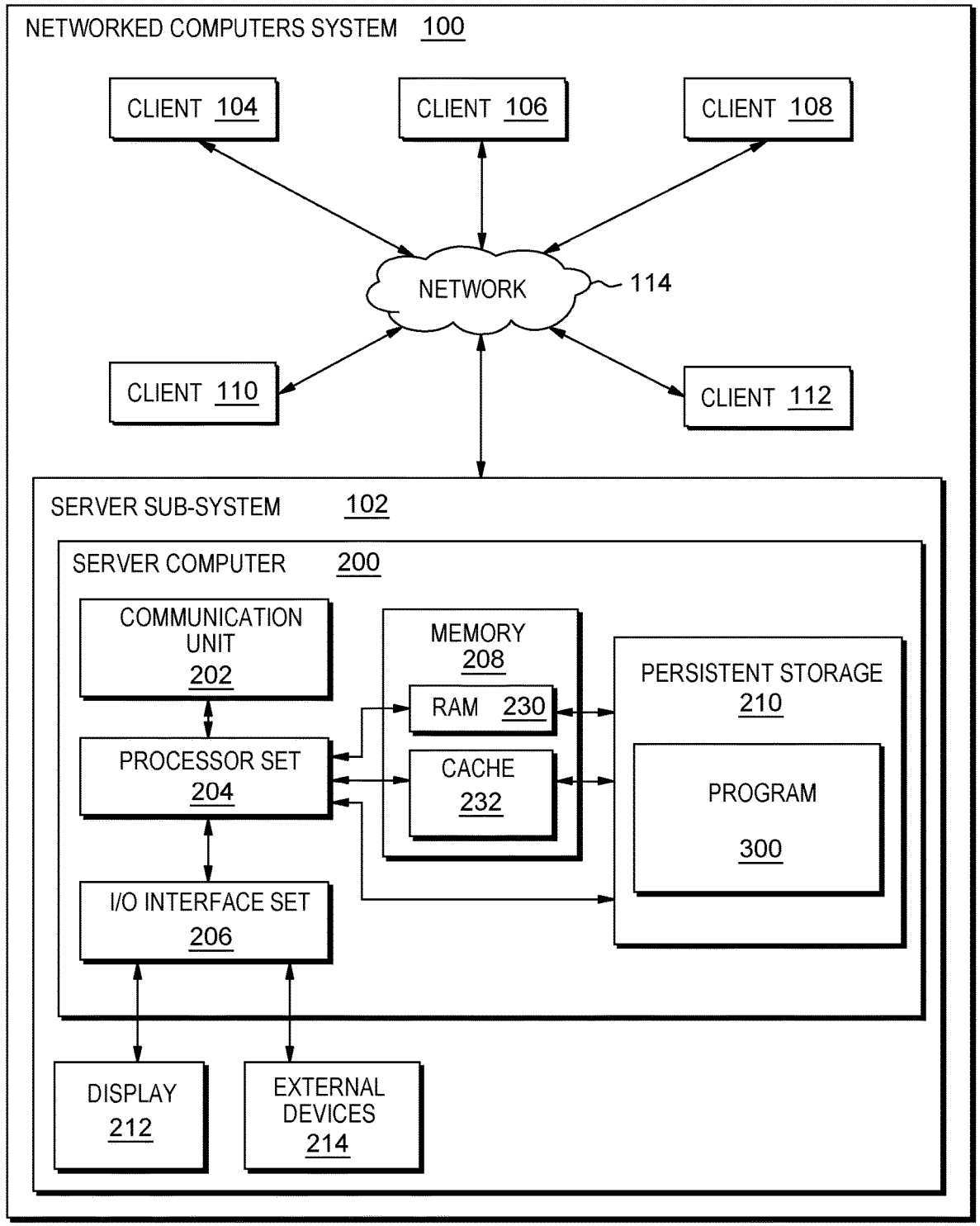
FIG. 1 is a block diagram view of a first embodiment of a system according to the present invention.

This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: server sub-system 102; client sub-systems 104, 106, 108, 110, 112; communication network 114; server computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments, the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
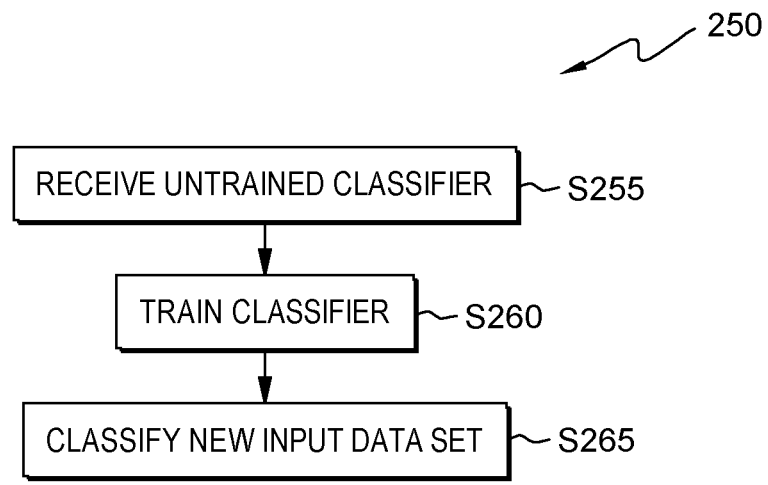
FIG. 2 is a flowchart showing a first embodiment method performed, at least in part, by the first embodiment system.
Figure 3:
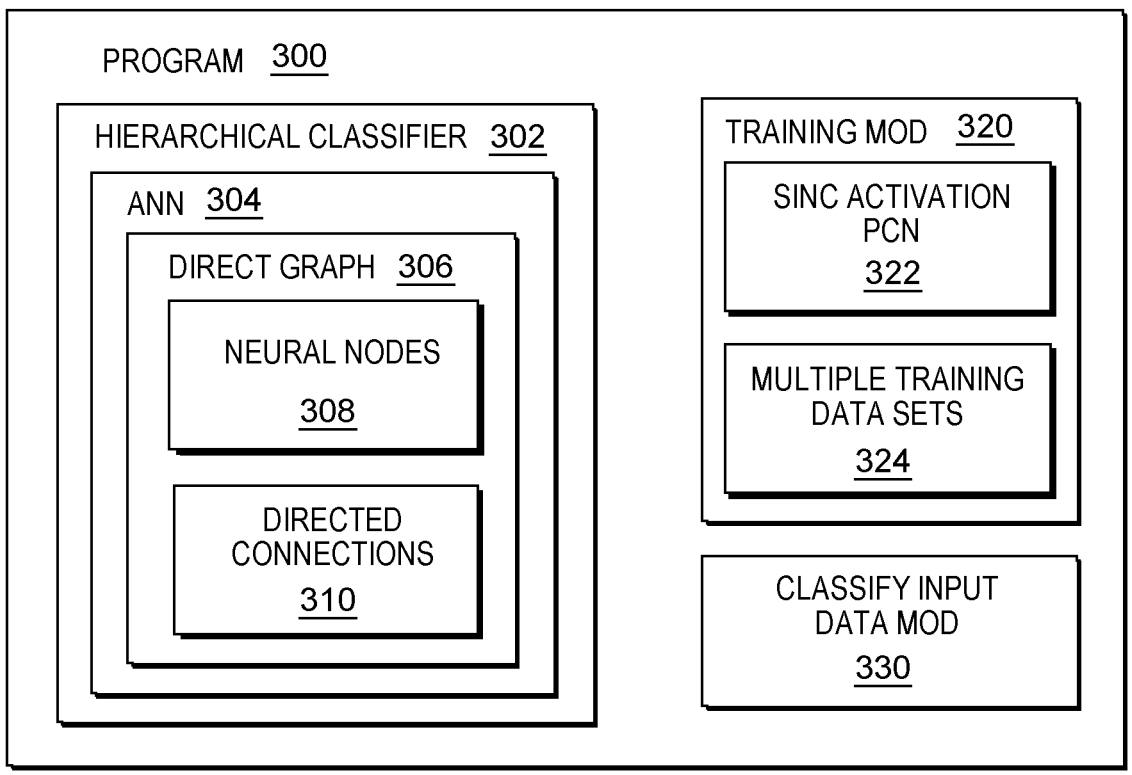
FIG. 3 is a block diagram showing a machine logic (for example, software) portion of the first embodiment system.

FIG. 2 shows flowchart 250 depicting a method according to the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Processing begins at operation S255, where untrained hierarchical classifier 302 is received. This untrained hierarchical classifier includes artificial neural network 304 that includes a directed graph model 306 including multiple neural nodes 308 and multiple directed connections 310 among and between the nodes.

Processing proceeds to S260 where training module ("mod") 320 trains the untrained hierarchical classifier algorithm to obtain a trained hierarchical classifier 302 using a sinc function as an activation function 322 and multiple sets of training data 324 that are respectively selected to range across a hierarchical category at some level of the hierarchy. For example, a wide ranging training data set is used to train the highest level of the hierarchy. Multiple intermediate level training data sets respectively train hierarchical categories at a next lower level of the hierarchy. Multiple low level training data sets are used to respectively train for making identifications at even lower levels of the hierarchy.

Processing proceeds to operation S265, where classify input data mod 330 applies trained hierarchical classifier to a set of input data (received from client 104 through communication network 114 (see FIG. 1)) to determine multiple hierarchical categories to which the input data set belongs. In this case, the input data is a file with audio representing the sound of a malfunctioning jet engine. In this example, the classify input data mod classifies the sound as belonging to three hierarchical categories existing to three levels of a hierarchy of sounds as follows: (i) highest level hierarchical category=machinery sounds; (ii) intermediate level hierarchical category=vehicular machinery sounds; and (iii) low level category=aircraft engine sounds. Methods of the training hierarchical classifiers, using with the sinc activation function, will be discussed in more detail in the following sub-section of this Detailed Description section.

III. Further Comments and/or Embodiments

Some embodiments of the present invention recognize the following facts, potential problems and/or potential areas for improvement with respect to the current state of the art: (i)

Artificial Neural Network (ANN) is a known computational technique to classify a pattern (this is, determine whether the pattern belongs in a particular category (in a non-hierarchical classifier context) or in a multiple hierarchically related categories in a hierarchical classifier context—for example a pattern of data classified in the category "dog" would also be classified in the supercategory of "mammal"); (ii) ANN is used in pattern recognizing and supervised machine learning; (iii) an ANN can be represented as a weighted graph where: (a) nodes are responsible for a mathematical calculation, and (b) edges are the inputs based on which calculations are executed in nodes; and/or (iv) the nodes (except the input layer) operate somewhat similarly to biological neurons which are: (a) activated only when a certain threshold is crossed, or, otherwise (b) keep dormant.

In currently conventional classifier implementations, activation is achieved through a set of mathematical equations in ANN as follows:

$$y=w*x+b$$

$$y_{output}=f(y)$$

where w is the aforementioned weight of the input edge, x is the input coming from the previous layer or input layer, b is the bias, $y_{output}$ is the output of a node and f(y) is an activation function.

Currently conventional ANNs typically use sigmoid functions as activation functions, Rectified Linear Unit etc. The sigmoid functions do not have any oscillation and have only one global extremum but no local extremum when used as an activation function to train the ANN. Whereas these networks are perfectly fine for training a ANN (Artificial Neural Network) that learns to classify a single type of object. Say, if it is desired to classify specific breed of dogs from a picture of dog, this type of network is fine but if a currently conventional classifier provide a picture of any other animal (say, a picture of an elephant) as the input to that network, the currently conventional classifier: (i) will try to match that picture against the various breeds of dog defined during training of the classifier; and (ii) will likely produce an erroneous classification or a classification of limited informational value (for example, a classification that an elephant is simply something other than a dog).

At least some currently conventional classifiers can't say "NO" to input (for example, these currently conventional classifiers are not programmed to have the capacity to classify an elephant simply in a "non-dog category"). This means that these currently conventional classifiers can't take any decision as it can't decide if the input image lies within the intended domain of classification. Moreover, even with the pictures from the classification domain taken as input, currently conventional classifiers can only classify the breed of the dog in our example but not the other, higher hierarchical levels that are also applicable to the picture of dog, like the dog's genus, family, suborder, order, etc. However, some embodiments of the present invention recognize that this kind of hierarchical categorization is quite useful for a more demanding classification scenario.

Consider a trained classifier (sometimes also herein referred to as a "model") that has been trained only to determine breed of a dog from a photograph of the dog. In this example situation, a user inputs to the trained model a picture of a strange animal that he has not seen earlier (for the simplicity, suppose the user doesn't know any animals other than dog) and that the picture input by the user certainly is not a dog. The user wants to get some information about the animal because, later on, the user can have more specialized search performed on the unidentified animal in his picture. If a conventional neural network is used, it would match the image with a particular breed of dog to which it found the maximum similarity. However, some neural network models that are trained according to inventive methods of the present invention will give the user information up to the name of the animal as to whether it is a cat, mongoose, elephant, etc.

Some embodiments of the present invention may include one, or more, of the following features, characteristics and/or advantages: (i) a design of an artificial neural network using cardinal sine activation function that will hierarchically classify a problem input from broader classification to a more specialized one; and/or (ii) a hierarchical classifier including a neural network. As specific example of an embodiment of item (ii) in the preceding list: a hierarchical classifier that can classify an image of an Indian Pariah dog as belonging to all of the following hierarchically related categories: animal, vertebrate, mammal, canine and Indian Pariah. In this example, the classification domain can be set as Animal Kingdom, with the result that this classifier won't classify further any image if it is not an animal.

Some embodiments of the present invention may include one, or more, of the following features, characteristics and/or advantages: (i) use of the sine function and/or cardinal sine ("sinc") function as an activation function for the ANN of a classifier (for example, a hierarchical classifier); (ii) use of a sinc curve with multiple local minimum where the amplitude of the curve decreases with increasing period of the curve in each direction; (iii) classifier with an ANN modeled after sinc function that can perform more specialized pattern recognition as the period of the curve is increased; and/or (iv) the activation function affects significantly in error reducing of cost function of the ANN.

In some embodiments of classifiers according to the present invention, the training set for the network will be divided into multiple sets. First set will be introduced to the network with weights initialized after a specific manner described below. The weights will stabilize for the root of the hierarchy intended for the ANN. Then the second training set will be introduced to the network. Weights in the network for the second training set have to be initialized after a specific manner described below. The second training set is more specialized than the first one. The second training set will stabilize the weights of the network again for the child hierarchy. This way, more specialized training set will be added as much as specialization the network is intended. The user/implementer of the network has to remember the weights after each training set.

Some embodiments of the present invention may include one, or more, of the following features, characteristics and/or advantages: (i) if the input is not intended for the network, the input will be rejected midway instead of producing misleading output; (ii) a universal/hierarchical classifier can be produced using this proposed type and theoretically this network will be able to recognize every pattern in universe in hierarchical manner; (iii) the network will be able to guess the output to some extent if the network is not built to classify the input (for example, if the input is of elephant but not the specific breed of dogs, this network will at least classify the input as elephant; (iv) whatever advancement is made in training the model in parallel, it requires merging the finding in each parallel training to other ones—much like Map-Reduce techniques; (v) these merging operations are extra overhead which is completely removed in some embodiments of classifiers according to the present invention; (vi) that large training set of conventional network is divided in multiple training sets with each subsequent sets are more specialized than its previous one; (vii) each training set deduces different weights of the network model; and/or (viii) as the weights are not dependent on the results of other training set, the trainings can be done in complete parallel with no requirements for merging.

An embodiment of a hierarchical classifier according to the present invention will be described in the following paragraphs.

Cardinal Sine or Sinc curve:

$f(x)=1$ for $x=0$ $f(x)=\sin(x)/x$ for $x \neq 0$

The above sinc curve has domain of $[-6\pi, 6\pi]$. Modifying the function a little, it can be formulated as follows (this formulation is sometimes referred to as a "Truncated Cardinal Sine" or "Truncated Sinc"):

$f(x)=1$ for $x=0$ $f(x)=\sin(x)/x$ for $x>0$ $f(x)=1$ for $x<0$

Figure 4:
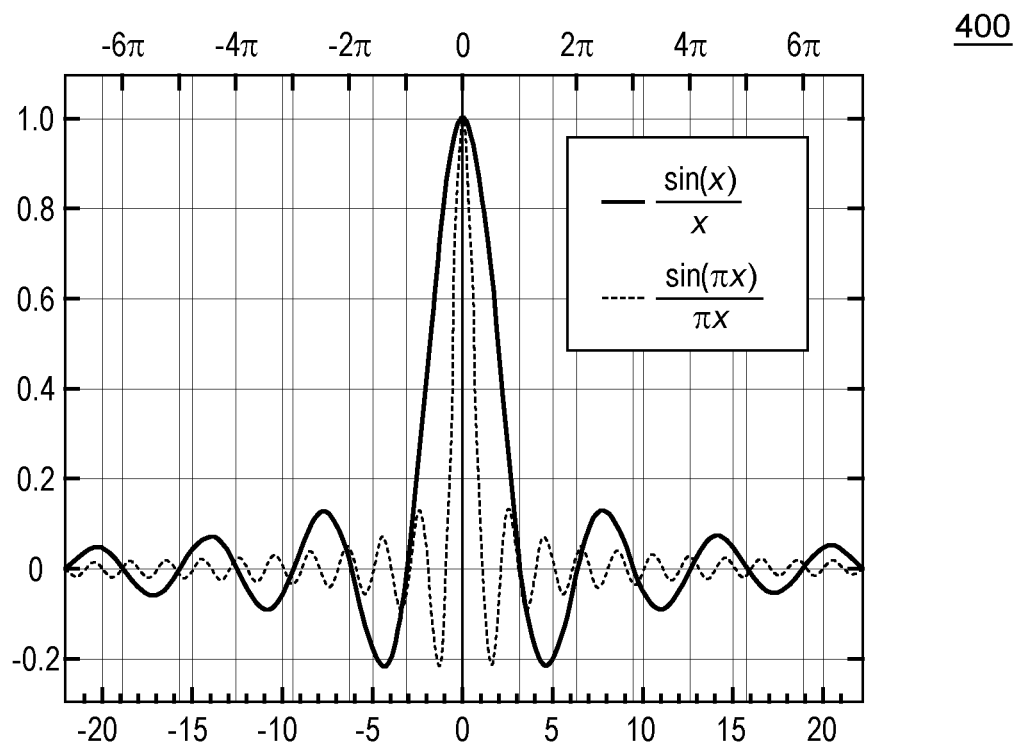
FIG. 4 is graph showing a sinc function that can be applied in some embodiments of the present invention.

As shown in graph 400 of FIG. 4, the left part of the curve (from $x=0$ in the graph) will be always at 1. Then, the steepest slope appears first and as we go right, the curve's oscillation reduces. The classifier embodiment now under discussion applies this property of Truncated Cardinal Sine curve to the proposed design of its ANN component.

In the embodiment now under discussion, the aim is to find the global minimum for one training set in case of most of the conventional neural network. In this model ANN: (i) there are multiple training sets; (ii) local minimum, instead of global minimum, is found for each training set; and (iii) for each training set, the weight of the edges connecting the nodes is initiated after a fashion so that each node output always resides in a separate concave portions (trough) of the curve for each training set. In the embodiment now under discussion, the foregoing is the main logic behind how Truncated Cardinal Sine function acts as hierarchical classifier.

The overall design of the ANN for the classifier embodiment now under discussion, which uses Truncated Cardinal Sine function as an activation function, will now be discussed. The ANN is trained with multiple training sets where each training set will be more specialized (that is, will represent a lower level of the hierarchy of classification categories) one than the previous training set. In this hierarchical classifier embodiment, the hierarchical classifier will accept any picture of any vertebrate animal and is only used to recognize a particular breed of dogs (for example, Greyhound). The hierarchical classifier categorizes the proposed design of network as third degree, as will be further discussed, below. From the perspective of the end user of the hierarchical classifier, there are three degrees as follows: (i) at first the network will identify the hierarchical category of "mammal" from the input picture of the vertebrate animal (that is, "mammal" is the first degree (or first level) hierarchical category); (ii) then the hierarchical classifier identifies the hierarchical category of "dog" out of the hierarchical child categories of the "mammal" category (that is, "dog" is the second degree (or second level) hierarchical category); and (iii) then the hierarchical classifier identifies the hierarchical category of "Greyhound" as the appropriate child hierarchical category of "dog" (that is, "Greyhound" is the third degree (or third level) hierarchical category). As it is total three level of recognition, it is named "third degree." This embodiment can increase the number of degrees of the network to provide as much specificity (or generalization) as demanded by a particular application.

Figure 5:
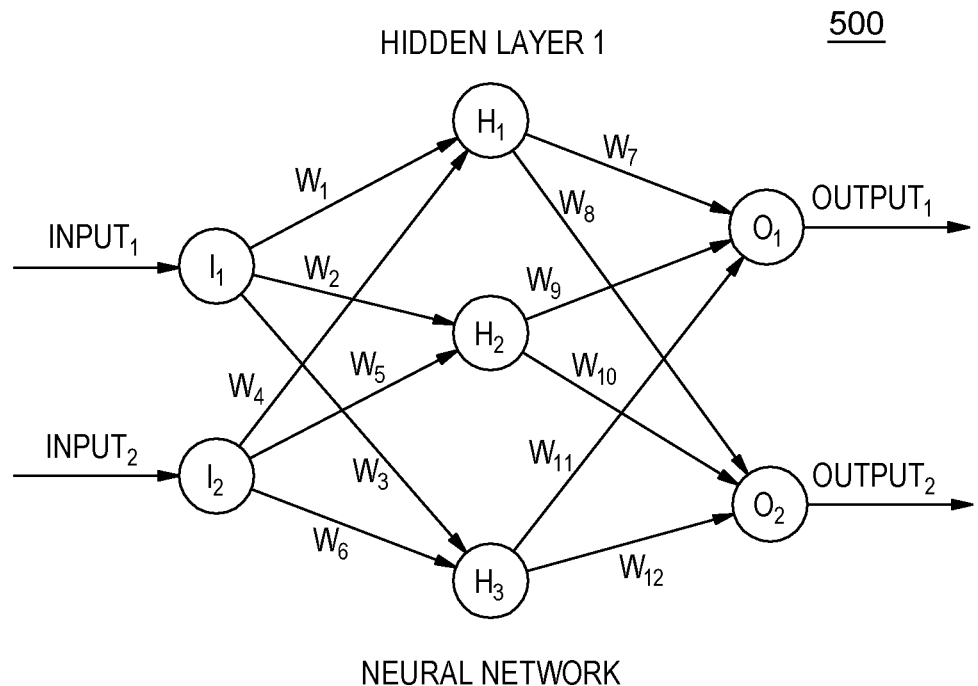
FIG. 5 is a directed graph included in an ANN of an embodiment of the present invention.

Directed graph 500 of FIG. 5, shows an example of an ANN for use in the hierarchical classifier embodiment now under discussion. The ANN consists of two input neurons, three hidden neurons and two output neurons. Each neuron in a layer is connected to that of previous layer with a connection that carries a specific weight. Input neurons have values equal to the input value they are provided with. In this case, $I_1$ has value equal to that of $Input_1$ and $I_2$ has value equal to that of $Input_2$.

The ANN of the hierarchical classifier embodiment under discussion: (i) is provided with a first training data set; and (ii) in response, updates the weights of the directed graph of the ANN in a manner that will now be discussed in the following paragraphs.

The Forward Pass will now be discussed. The total net input to each hidden layer neuron is determined by: (i) squashing the total net input using Positive Cardinal Sine function; and (ii) hence, obtaining the value of each hidden layer neuron.

Considering an example with a total net input of $H_1$ neuron as $net_{h1}$ $$net_{h1} = W_1 * I_1 + W_4 * I_2 + b_1$$

where, $b_1$ is the bias added for the hidden layer. In this proposed model of hierarchical classifier, certain considerations are applied in selecting the weights. In conventional ANNs, the weights are initialized with a random number, but the hierarchical classifier now under discussion determines the weights carefully so that $net_{h1}$ lies between $\pi$ to $2\pi$ for the first training set. $W_1$ and $W_4$ are calculated in a way that will be discussed in the following paragraphs.

Step 1: Take $W_4 * I_2$ term out of consideration for now. This yields a temporary equation as follows:

$$net_{H1} = W_1 * I_1 + b_1$$

$$Or,\ net_{H1} - b_1 = W_1 * I_1$$

Here, $b_1$ is a fixed value for a particular hidden layer. This means that:

$$\pi \leq net_{H1} \leq 2\pi$$

It then follows that:

$$\pi - b_1 \leq W_1 * I_1 \leq 2\pi - b_1$$

The minimum value of $W_1$ is:

$$(\pi - b_1)/Max(I_1)$$

and maximum value of $W_1$ is:

$$(2\pi - b_1)/Min(I_1)$$

The value of $W_1$ is initialized with any value within this range. More intuitive consideration may increase this range of values that $W_1$ can take.

Step 2: $W_4$ is calculated and brings up the original equation of:

$$net_{H1} = W_1 * I_1 + W_4 * I_2 + b_1$$

This means that:

$$\pi \leq net_{H1} \leq 2\pi$$

$$Or,\ \pi - b_1 \leq W_1 * I_1 + W_4 * I_2 \leq 2\pi - b_1$$

$$Or, (\pi - b_1 - W_1 * I_1) \leq W_4 * I_2 \leq (2\pi - b_1 - W_1 * I_1)$$

So, $W_4$ lies between:

$$((\pi - b_1 - W_1 * Max(I_1))/Max(I_2))\ to\ ((2\pi - b_1 - W_1 * Min(I_1))/Min(I_2))$$

Figure 6:
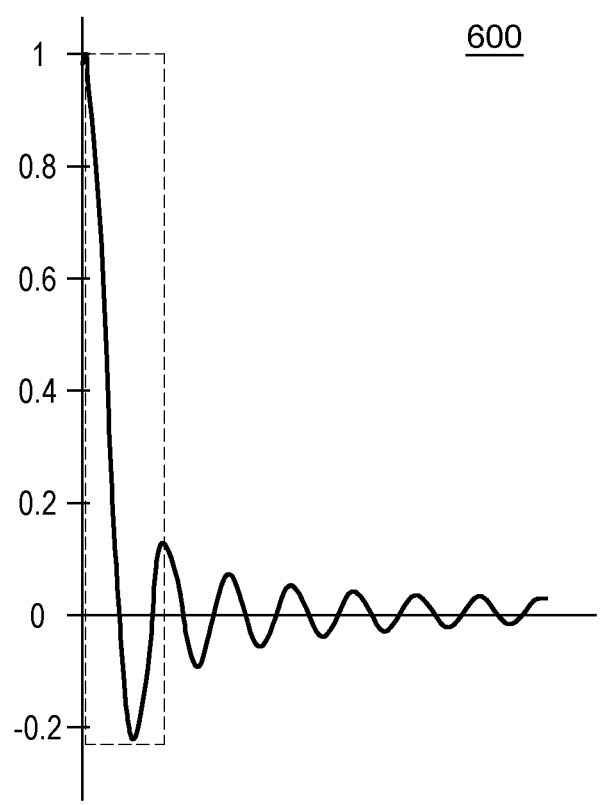
FIG. 6 is graph showing a sinc function applied in an embodiment of the present invention.

All of these careful considerations for the weights are taken so that $net_{H1}$ could lie on the curve in the region enclosed by the dotted rectangle shown in graph 600 of FIG. 6.

The $net_{H1}$ is then squashed using the positive sinc function to get the output of $H_1$ neuron as follows:

$$output_{H1} = \sin(net_{H1})/net_{H1}$$

The above mentioned steps are repeated for all of the other weights in hidden layer 1.

Weights and neuron values in output layer (that is, from hidden neurons to output neurons) are now calculated. Here is the output for $Output_1$:

$$net_{O1} = W_7 * output_{H1} + W_9 * output_{H2} + W_{11} * output_{H3} + b_2$$

The weights in this layer are determined in a manner similar to that explained in connection with the previous layer using the following inequality:

$$\pi \leq net_{O1} \leq 2\pi$$

And then the output of $O_1$ is determined as follows:

$$output_{O1} = \sin(net_{O1})/net_{O1}$$

Then carrying out the same process for $O_2$:

$$output_{O2} = \sin(net_{O2})/net_{O2}$$

A softmax function may be used in this layer to squish the outputs within [0, 1].

Calculating the Total Error will now be discussed. The error is calculated for each output neuron using the squared error function and then summed to get the total error as follows:

$$\Sigma_{total} = \Sigma \tfrac{1}{2}(target - output)^2$$

The Backwards Pass will now be discussed. Backpropagation is applied to update each of the weights in the network so that they cause the actual output to be closer to the target output, thereby minimizing the error for each output neuron and the network as a whole. Consider $W_7$. To determine how much a change in $W_7$ affects the total error:

$$aka\ \delta E_{total}/\delta W_7$$

$$\delta E_{total}/\delta W_7 = \delta E_{total}/\delta output^{O1} * \delta output^{O1}/\delta net_{O1} * \delta net_{O1}/\delta W_7$$

This is the standard method of reducing error in currently conventional ANNs, and, therefore, those of skill in the art will understand that the weights of the edges of the directed graph of the ANN can be stabilized so that the ANN can recognize any pattern with a relatively high level of reliability.

This embodiment of a hierarchical classifier provides multiple training sets, as mentioned earlier. The first training data set, in this example of recognizing a data pattern as belonging to the "Greyhound" hierarchical child category of the "dog" category, consists only of pictures of vertebrate animals spanning over the entire category of "vertebrate" (that is, the training data set includes images of birds, images of reptiles, images of dogs, images of cats, images of humans, etc.). The network weights will stabilize according to the above mentioned technique. The second training data set consists of images of mammals, like humans, dogs, cats, tigers, etc. Before this mammalian training data set is applied, new weights are initiated for each of the edges of the directed graph of the ANN, similar to what was done for the vertebrate training data set. In this case, limits for $net_{H1}$ will be:

$$3\pi \leq net_{H1} \leq 4\pi$$

Minimum and maximum limit of $net_{H1}$ is increased by exactly $2\pi$. Similarly, minimum and maximum limit of netO1 is increased by exactly $2\pi$. And so on for the next training sets.

Now it will be explained why the ANN of this embodiment is characterized as "third degree," with reference to the sinc curves of FIG. 4 and FIG. 6. The graphs of FIGS. 4 and/or 6 show that if one proceeds through the above mentioned design of the ANN of this embodiment, then the local minima of all the vertebrates (that is, the vertebrate training data set) will reside in the region marked in the graph 600 of FIG. 6. The input value of the function increases for the next mammal training data set and the weights of the edges of the directed graph are initiated based on that. This means that the mammal training data set will reside in the region marked by mammal, and so on through the increasing degrees (that is, the increasing hierarchical levels of categories implemented in the hierarchical classifier).

Only three concave parts (troughs) of the sinc function are occupied for this particular network, so the ANN of this hierarchical classifier embodiment is characterized as being of the third degree. Alternatively, ANNs of higher degrees can be generated that can handle a wider of inputs to be classified by the classifier. This is how an end user can use this model to categorize her picture. It is helpful to remember the weights of the network after each training data set. For example, when an end user provides a picture of, say, a monkey, the network will use that set of weights eventuated from the first training set. The network will, with relatively high reliability, classify the monkey image in the hierarchical category of "mammals." The end user should, therefore, apply to the edges of the directed graph of the ANN that set of weights which determined after the second training set. The ANN will not reliably classify the monkey image in the next level hierarchical category of "dogs," so the end user should stop the network from further processing.

Some embodiments of the present invention may include one, or more, of the following features, characteristics and/or advantages: (i) the ANN can act as a hierarchical classifier; (ii) the ANN can be called a smart neural network which classifies the input more efficiently and effectively than currently conventional neural networks; (iii) as the model can be trained with multiple training sets; (iv) each training set trains the models with different weights; (v) the training can happen in parallel without the need of any extra calculation typically required in currently conventional ANNs (that is, parallel training requires a lot of extra calculation to merge the weights deduced from each parallel training); (vi) this design can handle a larger larger variety of input than current conventional ANNs and classify them smartly; and/or (vii) this design can find its application in exploring new patterns, classifying patterns from a large variety of inputs.

An embodiment of a method according to the present invention includes the following operations: (i) initiate the weights and input matrices; (ii) produce the training sets where each set is more specialized than the previous one; (iii) assign the weights in the network in the above mentioned way; (iv) produce the values from the set as input to the network; (v) calculate the inner neuron values using truncated cardinal sine function; (vi) calculate the output values of neurons and the error for each output neuron using the squared error function and sum up them to get the total error; (vii) apply backpropagation algorithm until the network stabilizes; (viii) after stabilizing the network, save the weights for each training set; and (ix) if there is one more training set, go to step (ii) or else return.

Some embodiments of the present invention may include one, or more, of the following features, characteristics and/or advantages: (i) hierarchical classification of the input subject; (ii) completely parallel training of the network model with no requirement to merge the results found in each training; (iii) smart neural network that won't classify the input object if it is not intended to be classified by the network but provide a great deal of hierarchical information of that object; (iv) a Hierarchical Classifier or Universal Classifier or Multi-level Classifier; (v) a classifier that takes more than one type of input and produces more than one hierarchical category level determination based on the inference drawn on the input subject(s); (vi) if a new subject is introduced as input to the classifier, erroneous matching against the closest similar object is avoided so that more reliable and useful information is obtained from the inferences of classifiers according to the present invention; (vii) subject will be classified hierarchically from its generalized category to more a specialized category; (viii) able to extract more information from a subject than currently conventional classifiers; (ix) if the input subject doesn't match to any desired output, some information about the type of the input subject still can be obtained using this classifier; and/or (x) the name of classifiers according to some embodiments of the present invention can be accurately termed as "Universal Classifiers" because the classifier can extract information about the input subject till a certain extent even if it is completely unknown to the classifier.

Some embodiments of the present invention may include one, or more, of the following features, characteristics and/or advantages: (i) use of Cardinal Sine as an activation function in the universal classifier; (ii) use of Sine curves as an activation function in an ANN of a classifier (as sine curves exhibit oscillation and hence, multiple local minimum; (iii) reduces chances that a local minimum will be erroneously considered as global minimum while calculating the weights of edges of a directed graph of a classifier's ANN; (iv) net output can be bounded within one trough of the sine curve, but, if only one trough of the curve is used to train all of the training data, then that trough can be easily saturated and so, some embodiments divide the training data into multiple sets; and/or (v) use of multiple training data sets that: (a) start with a wider range of subject matter to train on higher hierarchical level(s) of classification, (b) continue training with intermediate range of subject matter data sets to train on intermediate hierarchical level(s) of classification, and (c) further continue training with specific ranges of subject matter data sets to train on lower hierarchical level(s) of classification.

As an example of item (v) in the list of the preceding paragraph, in case of classifying a particular breed of dog, our training set can be divided as Vertebrates→Mammals→Quadruped Animals→Canines→All the breed of the dogs. Now, for such a trained model, information can be reliably gathered about the input subject as far as the subject progress through each hierarchy. In some embodiments, cardinal Sine or Sinc curve is used as an activation function because of the above explained progression from generalized training data sets to more specific training data sets. Similarities between the patterns in each training set will increase. As sinc curve has this property of gradual decreasing troughs and, hence, gradually decreasing length of the curve, finding global minimum in each trough will take less time as processing goes forward within the hierarchical structure.

Some embodiments of the present invention may include one, or more, of the following features, characteristics and/or advantages: (i) a complete parallel training that does not require to merge the results; (ii) whatever advancement is made in training the model in parallel, it requires merging the finding in each parallel training to other ones—much like Map-Reduce techniques; (iii) avoids these merging operations, and associated extra overhead; (iii) each training set deduce different weights of the network model; and/or (iv) as the weights are not dependent on the results of other training set, the trainings can be done in complete parallel with no requirements of merging.

Some embodiments of the present invention may include one, or more, of the following features, characteristics and/or advantages: (i) use cardinal sine or sinc function as an activation function for the artificial neural network; (ii) as sinc curve has multiple local minimum and the amplitude of the curve decreases with increasing period of the curve in each direction, the network modeled after sinc function has this particular feature of specializing in pattern recognition as the period of the curve is increased; (iii) the activation function affects significantly in error reducing of cost function of the ANN; (iv) in this mechanism, the training set for the network will be divided into multiple sets; (v) first set will stabilize the weights for use in making the highest hierarchical level classification intended for the ANN; (vi) the second training set will be introduced to the network, such that weights in the network for the second training set have to be initialized after a specific manner described, below; (vii) the second training set is more specialized than the first one; (viii) the second training set will stabilize the weights of the network again; (ix) this way, more specialized training set will be added as much as specialization the network is intended; and/or (x) the user/implementer of the network should to remember the weights after each training set.

Some embodiments of the present invention may include one, or more, of the following features, characteristics and/or advantages: (i) if the input is not intended for the network, the input will be rejected midway instead of producing misleading output; (ii) universal classifier can be produced using this proposed type and theoretically this network will be able to recognize every pattern in universe; (iii) the network will be able to guess the output to some extent if the network is not built for the input (that is, if the input is of elephant but not the specific breed of dogs, this network will at least classify the input up to the mammal); and/or (iv) performs hierarchical classification with the use of cardinal sine function in a special technique.

Some embodiments of the present invention may include one, or more, of the following features, characteristics and/or advantages: (i) provides both of the following: (a) a basic design of hierarchical classifier that implements multiple classifiers from generalized (coarse) to specialized (detailed) ones, and (b) usage of cardinal sine function (or regular sine function) as activation function; (ii) uses cardinal sine function in a unique way to solve the problem of hierarchical classification; (iii) bounded region of the weights in the neural network is updated before the starting of each training; (iv) backpropagation algorithm does not have to explore a vast region for global minimum but only a small bounded region; (v) avoids computation relative to classifiers where backpropagation algorithms need to find the global minimum again from scratch across the vast region same for coarse to detailed classification; and/or (vi)

reduces the bounded region as progressed further along the curve wherein this property is not available for sine curve or cosine curve.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method comprising:
    receiving an untrained hierarchical classifier than includes an artificial neural network that includes a directed graph model including a plurality of nodes and a plurality of directed connections among and between the nodes; and
    training the untrained hierarchical classifier algorithm to obtain a trained hierarchical classifier using a sinc function as an activation function;
    wherein:
        the sinc function is a truncated sinc function defining a plurality of troughs; and
        each trough of the plurality of troughs corresponds to one hierarchical level of a hierarchy of categories to be identified by the trained hierarchical classifier.

2. The method of claim 1 further comprising:
    receiving a first input data set; and
    applying the trained hierarchical classifier to the first input data set to identify a plurality of hierarchical categories, respectively at different hierarchical levels, to which the first input data set belongs.

3. The method of claim 1 wherein the training includes the use of a plurality of training data sets including:
    a first training data set including training data ranging across a range defined by a highest level category of a hierarchy of categories;
    a second training data set including training data ranging across a range defined by a first intermediate level category of the hierarchy of categories, with the highest level category being inclusive of the first intermediate level category; and
    a third training data set including training data ranging across a range defined by a first low level category of the hierarchy of categories, with the first intermediate level category being inclusive of the first low level category.

4. The method of claim 3 further comprising:
    receiving a first input data set; and
    applying the trained hierarchical classifier to the first input data set to identify the first input data set as indicative of subject matter belonging to all of the following hierarchical categories: the highest level category, the first intermediate level category and the first low level category.

5. The method of claim 1 wherein the training includes:
    application of a backpropagation algorithm that explores only a bounded region defined by the sinc function.

6. A computer program product comprising:
    a non-transitory machine readable storage device; and
    computer code stored on the non-transitory machine readable storage device, with the computer code including instructions for causing a processor(s) set to perform operations including the following:
    receiving an untrained hierarchical classifier than includes an artificial neural network that includes a directed graph model including a plurality of nodes and a plurality of directed connections among and between the nodes, and
    training the untrained hierarchical classifier algorithm to obtain a trained hierarchical classifier using a sinc function as an activation function;
    wherein:
        the sinc function is a truncated sinc function defining a plurality of troughs; and
        each trough of the plurality of troughs corresponds to one hierarchical level of a hierarchy of categories to be identified by the trained hierarchical classifier.

7. The computer program product of claim 6 wherein the computer code further includes instructions for causing the processor(s) set to perform the following operations:
    receiving a first input data set; and
    applying the trained hierarchical classifier to the first input data set to identify a plurality of hierarchical categories, respectively at different hierarchical levels, to which the first input data set belongs.

8. The computer program product of claim 6 wherein the training includes the use of a plurality of training data sets including:
    a first training data set including training data ranging across a range defined by a highest level category of a hierarchy of categories;
    a second training data set including training data ranging across a range defined by a first intermediate level category of the hierarchy of categories, with the highest level category being inclusive of the first intermediate level category; and
    a third training data set including training data ranging across a range defined by a first low level category of the hierarchy of categories, with the first intermediate level category being inclusive of the first low level category.

9. The computer program product of claim 8 wherein the computer code further includes instructions for causing the processor(s) set to perform the following operations:
receiving a first input data set; and
applying the trained hierarchical classifier to the first input data set to identify the first input data set as indicative of subject matter belonging to all of the following hierarchical categories: the highest level category, the first intermediate level category and the first low level category.

10. The computer program product of claim 6 wherein the training includes:
application of a backpropagation algorithm that explores only a bounded region defined by the sinc function.

11. A computer system comprising:
a processor(s) set;
a non-transitory machine readable storage device; and
computer code stored on the non-transitory machine readable storage device, with the computer code including instructions for causing the processor(s) set to perform operations including the following:
receiving an untrained hierarchical classifier than includes an artificial neural network that includes a directed graph model including a plurality of nodes and a plurality of directed connections among and between the nodes, and
training the untrained hierarchical classifier algorithm to obtain a trained hierarchical classifier using a sinc function as an activation function;
wherein:
the sinc function is a truncated sinc function defining a plurality of troughs; and
each trough of the plurality of troughs corresponds to one hierarchical level of a hierarchy of categories to be identified by the trained hierarchical classifier.

12. The computer system of claim 11 wherein the computer code further includes instructions for causing the processor(s) set to perform the following operations:
receiving a first input data set; and
applying the trained hierarchical classifier to the first input data set to identify a plurality of hierarchical categories, respectively at different hierarchical levels, to which the first input data set belongs.

13. The computer system of claim 11 wherein the training includes the use of a plurality of training data sets including:
a first training data set including training data ranging across a range defined by a highest level category of a hierarchy of categories;
a second training data set including training data ranging across a range defined by a first intermediate level category of the hierarchy of categories, with the highest level category being inclusive of the first intermediate level category; and
a third training data set including training data ranging across a range defined by a first low level category of the hierarchy of categories, with the first intermediate level category being inclusive of the first low level category.

14. The computer system of claim 13 wherein the computer code further includes instructions for causing the processor(s) set to perform the following operations:
receiving a first input data set; and
applying the trained hierarchical classifier to the first input data set to identify the first input data set as indicative of subject matter belonging to all of the following hierarchical categories: the highest level category, the first intermediate level category and the first low level category.

15. The computer system of claim 11 wherein the training includes:
application of a backpropagation algorithm that explores only a bounded region defined by the sinc function.

* * * * *